Figure 1:
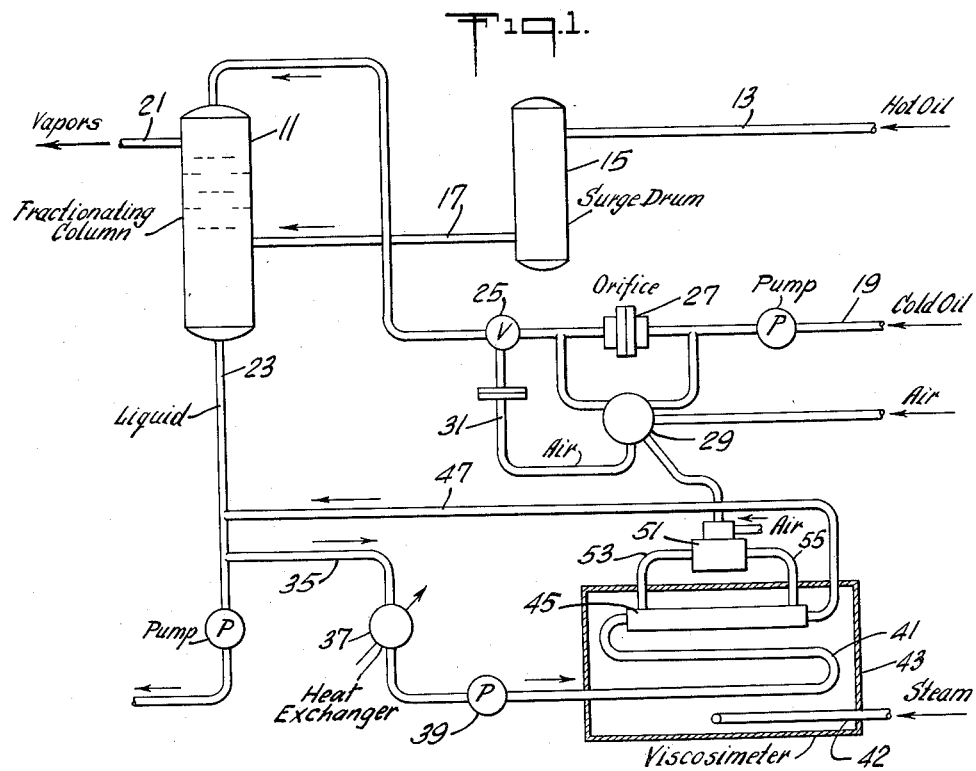

March 13, 1962

J. M. JONES, JR 3,025,232

AUTOMATIC CONTROL OF THE VISCOSITY OF
A FRACTIONATOR PRODUCT

Filed July 12, 1957

3,025,232
AUTOMATIC CONTROL OF THE VISCOSITY OF A FRACTIONATOR PRODUCT
James M. Jones, Jr., Port Arthur, Tex., assignor to Texaco Inc., a corporation of Delaware
Filed July 12, 1957, Ser. No. 671,584
6 Claims. (Cl. 208—347)

The present invention relates to a novel method of and apparatus for automatically controlling the viscosity of a liquid product stream by continuously measuring its viscosity, and employing the resulting measurement to regulate automatically the feed of at least one of a plurality of other liquid streams which are interacted with one another to produce the liquid product stream.

In an operation wherein such a liquid product stream is produced by the interaction of first and second raw material streams, it is usually difficult to maintain constant the composition and viscosity of the resultant product stream when one or both of the raw material streams vary in quality over a wide range. For example, in a petroleum refinery one operation is to produce a cycle fuel oil product from hot still bottoms which are fed to a fractionating tower, while at the same time feeding a relatively cool oil stream to the fractionating tower to assist in controlling vaporization of light fractions. Both the hot and cool feed streams generally vary greatly in quality, so that the cycle fuel oil taken off the bottom of the fractionating tower also generally varies in its viscosity.

The viscosity-gravity relationship of any cycle fuel oil produced in a thermal cracking operation is a function of the feed stock quality and the cracking conditions under which the cycle fuel oil is produced. Viscosity specifications, rather than gravity specifications ordinarily control cycle fuel oil quality. One type of mild cracking (visbreaking) results in a lower gravity for a given viscosity than may result from a different type of mild cracking (visbreaking) on the same stock. Furthermore, on a charge stock of constant quality there will be varying degrees of visbreaking in a battery of cracking units due to normal variations in heater outlet and soaker temperatures from unit to unit. Also, during the starting up period of any unit, cracking temperatures are abnormally low for a while.

In the past it has been customary to control the amount of cool oil mixed with the hot still bottoms by an automatic flow controller in the cool oil feed conduit, which is actuated either by a flow meter in the cool oil conduit, or by a temperature responsive device in the vapor outlet of the fractionating tower. Such controls normally would be adequate if a mere mixture of cool and hot oil were required, but it is the shift in the gravity-viscosity relationship which complicates the situation. With only such primary controls, viscosity of the cycle fuel oil will vary as cracking conditions vary, and optimum production of cycle fuel oil will not be obtained.

In accordance with the present invention there is provided a novel method for producing a liquid product stream of substantially constant viscosity, such as cycle fuel oil, by the interaction of first and second raw material streams, such as hot and cold still bottoms, flowing into a common vessel from which the resulting liquid product stream is then discharged. This is accomplished by withdrawing a portion of the liquid product as a continuous side stream after discharge from the vessel, continuously measuring the viscosity of the side stream, converting the resulting viscosity measurement to a signal proportional to viscosity, transmitting the signal to a flow regulator for one of the raw material streams, and automatically actuating the flow regulator to regulate the rate of flow of the raw material stream in accordance with changes in the magnitude of the signal whereby the viscosity of the product stream is held constant.

The invention will be described in more detail below in connection with FIGS. 1 and 2 of the drawing, which are schematic flow diagrams of a portion of a tar stripper unit in a petroleum refinery, each employing a different modification of the novel automatic control feature.

Referring to FIG. 1, a fractionating column or flash tower 11 is fed with hot pressure oil bottoms from a primary still (not shown) by means of a conduit 13 connected to a surge drum 15, which in turn is connected by a conduit 17 into column 11 below the bottom plate.

Column 11 is also fed with a relatively cool stream of the same type of pressure oil bottoms from a storage tank, which flow through a conduit 19 into the top of the column 11 for tempering the hot oil charge, thereby controlling the temperature of vapor leaving the top of the column through an outlet 21 and the quality of cycle fuel oil leaving the bottom of the column through the conduit 23.

Normally, a substantially constant rate of flow through the conduit 19 is maintained automatically by a flow regulator valve 25 in the conduit, which is actuated in response to the pressure drop across an orifice 27. Such actuation is through a conventional air-operated flow controller 29 which controls the pressure of the air in a tube 31 for adjusting the opening of valve 25.

The apparatus so far described is not adequate to assure a cycle fuel oil product from the bottom of the column of the desired constant viscosity, primarily because of the shift in gravity-viscosity relationship discussed above. If it were not for this shift a flow controller would be adequate by itself as a rule to maintain constant flash tower temperature. The operation is also affected adversely because both the hot and cold oil feeds ordinarily vary in quality as the operation continues, and because the flow rate of the hot oil may also vary. Furthermore, there is an inherent time lag which makes control difficult and further complicates the operation.

In accordance with the present invention, the above difficulties are overcome by withdrawing a portion of the cycle fuel oil product stream from conduit 23 through a side conduit 35 leading to a heat exchanger 37 wherein the temperature is adjusted to an approximately constant selected value. Usually the oil is too hot and must be cooled.

Then the oil passes to a pump 39 which pumps it at constant volumetric rate of flow to a viscosimeter V, wherein it flows through a pipe coil 41 immersed within a constant temperature water bath within a vessel 43 which is heated by a steam coil 42 to raise the temperature slightly to the value required for viscosity measurement. The cycle fuel oil then passes at constant temperature through a calibrated viscosimeter tube 45 and back through a conduit 47 into the conduit 23.

A pressure-differential responsive device 51 is connected across the calibrated tube 45 by a pair of longitudinally spaced ducts 53 and 55 so as to respond to pressure differential changes which are proportional to viscosity changes in the oil product. Device 51 transmits a signal pulse of any suitable type, such as pneumatic or electrical, to the flow controlling mechanism 29 and acts automatically to reset the controlling mechanism for an increase or decrease in the flow rate, when the viscosity has increased or decreased, thus actuating the flow regulating valve 25 and regulating the rate of flow of cold oil through conduit 19 in accordance with changes in the viscosity of the cycle fuel oil. Once the flow rate has been thus reset, the flow controller 27 continues to maintain a constant flow, at the new rate. A suitable viscosimeter V and a suitable pneumatic device 51 are described in my Patent 2,791,902 and in my copending application Serial No. 570,624, now Patent 2,887,881, respectively.

In the specific embodiment illustrated, regulation of viscosity is accomplished by resetting the controller 29 so as to reset the value of the constant flow rate established by the valve 25. For example, the viscosity increases above normal when the temperature in column 11 is too high so that too much vapor is passing off. To counteract this the viscosimeter resets controller 29 and causes valve 25 to open wider and increase the flow of cold oil. Conversely, when the viscosity decreases below normal, the controller 29 is reset so that the flow of cold oil is automatically reduced by valve 25 to raise the temperature in column 11 and increase the vapor discharge.

A suitable flow controller 29 with a reset feature is the Taylor Pneumatic Set Controller described in Bulletin 98159 (March 1944) of the Taylor Instrument Company.

The specific operation described to illustrate the principles of the invention is a difficult one to control because of the variables mentioned previously. However, when the method and apparatus described above were applied to the operation, it was found that the viscosity of the cycle fuel oil product could be controlled successfully within plus or minus 20 seconds Saybolt Universal. This is remarkably good control when it is considered that this cycle fuel oil is normally run to a specification of about 325 seconds Saybolt Furol at 122° F.

Figure 2:
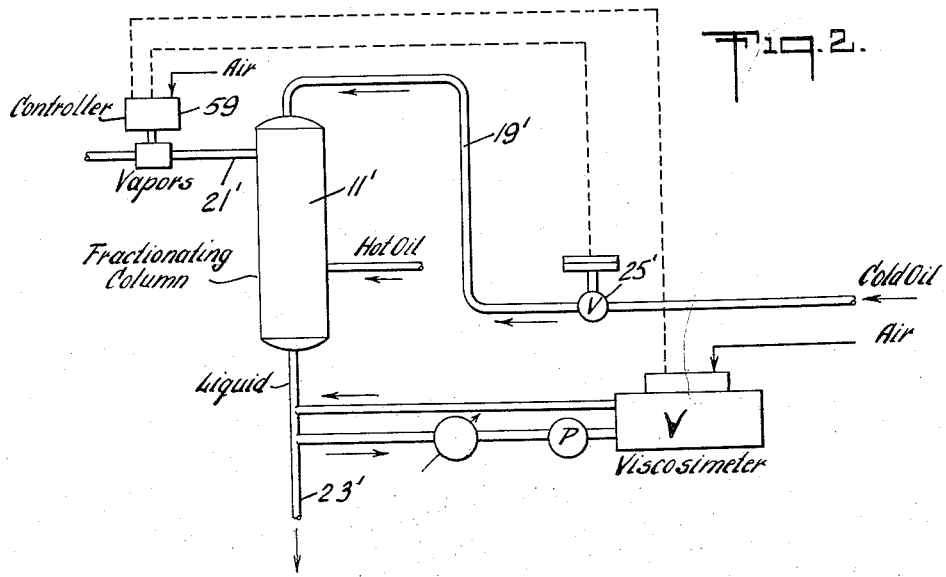

In the modification shown in FIG. 2, the primary regulation of cold still bottoms through conduit 19' is by a valve 25' controlled automatically by a temperature responsive flow controller 59 located in the vapor discharge conduit 21' near the top of tower 11'.

Variations in the temperature of the effluent vapor in conduit 21' act through controller 59 and produce changes in the adjustment of valve 25' as necessary to maintain constant the set flow rate of cold still bottoms.

The viscosity of the oil in conduit 23' is continuously measured by viscosimeter V' which acts automatically through pneumatic connections to reset flow controller 59 in a similar manner to the resetting of controller 29, thus increasing or decreasing the rate of flow through conduit 19' as required for constant viscosity.

If it were not for the described shift in gravity-viscosity relationship, the temperature responsive controller 59 alone would be adequate. This shift is compensated for by the viscosimeter as described.

When my viscosimeter is used to set the control point on a flow responsive controller or temperature responsive controller, then optimum results are obtained because cycle fuel oil viscosity is maintained as nearly constant as possible at all times. This is quite different in principle from merely mixing two streams to produce a mixture stream of predetermined viscosity.

While the invention has been described in one specific embodiment it should be apparent to persons skilled in the art that it also is applicable to many different types of operations wherein two liquids are interacted to produce a third liquid product. Among such other applications are:

Control of the draw-off rate on the side stream from a fractionating tower to obtain desired viscosity on the side stream.

Control of viscosity of fuel oil prior to entering burners by applying heat as necessary to lower the viscosity of the fuel to promote better atomization.

The viscosimeter employed in the present invention has been illustrated and described herein rather schematically, but is described more in detail in my copending application Serial No. 507,853, now Patent 2,988,914, and my Patent 2,791,902.

In the viscosimeters of the copending applications there is provision for compensating for temperature changes in the oil by modifying the signals transmitted by the differential pressure responsive mechanism. It is apparent that similar modifications may be employed in the present invention when more exact control is desired. In such a case, of course, the signal which actuates controllers 29 and 59 will not directly originate with the pressure differential mechanism 51, but will be generated when the original signal is transferred through intermittent temperature compensating devices. Nevertheless, the signal is the direct result of pressure differential response and is intended to be embraced within the terms of the claims.

It is also apparent that while both a heat exchanger 37 and a water bath 43 have been described to assure constant temperature of the oil, under conditions of constant temperature discharge from the column 11 it may not be necessary to adjust the temperature of the oil upstream of the viscosity measuring tube. Similarly, if reasonably precise temperature control is provided by heat exchanger 37, bath 43 may be eliminated. Even if temperature varies somewhat, however, compensation by the temperature compensating devices of my copending applications may be adequate.

Obviously, many modifications and variations of the invention, as hereinbefore set forth, may be made without departing from the spirit and scope thereof, and therefore only such limitations should be imposed as are indicated in the appended claims.

I claim:

1. In a method for fractionating the constituents of a continuous first stream of a petroleum product by passing said stream in a hot condition into a still, discharging a vapor fraction at the top of said still, discharging a liquid fraction at the bottom of said still, and regulating the temperature in said still by concurrently passing into said still a second relatively cool stream of substantially the same petroleum product, the improvement which comprises: withdrawing a portion of said liquid fraction as a continuous side stream after discharge from said still, adjusting said side stream to a selected constant temperature, continuously measuring the viscosity of said side stream after so adjusting the temperature thereof, converting the resulting measurement to a signal proportional to viscosity, transmitting said signal to a flow controller for said second stream of relatively cool petroleum product, and automatically actuating said flow controller to regulate the rate of flow of said second stream in accordance with changes in the magnitude of said signal whereby the viscosity of said liquid fraction is held constant.

2. In a method in accordance with claim 1, regulating the rate of flow of said second stream by automatically maintaining a constant rate of flow thereof with said flow controller in response to pressure drop in said second stream, and automatically adjusting said flow controller to change the magnitude of said constant rate of flow in accordance with changes in the magnitude of said signal.

3. In a method in accordance with claim 1, regulating the rate of flow of said second stream by automatically maintaining a constant rate of flow thereof with said flow controller in response to the temperature of the discharged vapor fraction, and automatically adjusting said flow controller to change the magnitude of said constant rate of flow in accordance with changes in the magnitude of said signal.

4. Apparatus for fractionating the constituents of a continuous first stream of a petroleum product, said apparatus comprising a still; a first conduit for passing a first stream of said petroleum product in a hot condition into said still; a second conduit for passing into said still a second relatively cool stream of substantially the same petroleum product to regulate the temperature therein; a flow controller in said second conduit; an outlet for a vapor fraction near the top of said still; a third conduit for conducting a liquid fraction from the bottom of said still; a fourth conduit for withdrawing a side stream from said third conduit; means for passing said side stream at constant volumetric rate of flow; means connected into said fourth conduit for continuously measuring viscosity of said liquid fraction; means for converting the resultant measurement to a signal proportional to viscosity; means for conducting said signal to said flow controller; and mechanism associated with said flow controller and operable by said signal for actuating said flow controller to regulate the rate of flow of said second stream in accordance with changes in the magnitude of said signal whereby the viscosity of said liquid fraction is held constant.

5. Apparatus in accordance with claim 4 wherein said flow controller comprises valve means responsive to pressure drop in said second conduit and operable to maintain automatically a constant rate of flow therethrough; and wherein said mechanism assocaited with said flow controller acts in response to changes in said signal to adjust said flow controller to change the magnitude of said constant rate of flow.

6. Apparatus in accordance with claim 4 wherein said flow controller comprises valve means responsive to the temperature of such vapor fraction in said outlet and operable to maintain automatically a constant rate of flow therethrough; and wherein said mechanism associated with said flow controller acts in response to changes in said signal to adjust said flow controller to change the magnitude of said constant rate of flow.

References Cited in the file of this patent

UNITED STATES PATENTS

| | | |
|---|---|---|
| 1,940,802 | Kallam | Dec. 26, 1933 |
| 2,119,786 | Kallam | June 7, 1938 |
| 2,242,419 | Cowles | May 20, 1941 |
| 2,308,490 | Chase | Jan. 19, 1943 |
| 2,322,814 | Binckley | June 29, 1943 |
| 2,707,964 | Monroe | May 10, 1955 |
| 2,915,462 | Salmon | Dec. 1, 1959 |